Oct. 23, 1962    F. A. POHL ETAL    3,059,996
PROCESS FOR PRODUCING BORON- AND PHOSPHORUS-FREE
HIGH PURITY SILICON DIOXIDE
Filed March 11, 1958
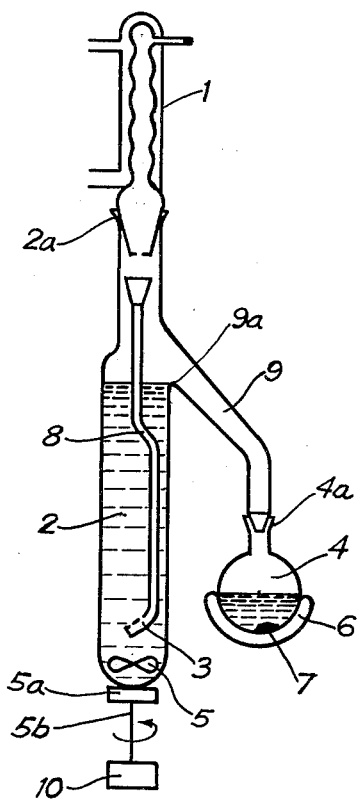
INVENTORS
FRANZ ARTHUR POHL
WILLI HEINRICH BONSELS
BY Toulmin & Toulmin
ATTORNEYS

United States Patent Office 3,059,996
Patented Oct. 23, 1962

3,059,996
PROCESS FOR PRODUCING BORON- AND PHOSPHORUS-FREE HIGH PURITY SILICON DIOXIDE
Franz Arthur Pohl and Wilhelm Heinrich Bonsels, Belecke (Moehne), Germany, assignors to Licentia Patent-Verwaltungs-G.m.b.H., Hamburg, Germany
Filed Mar. 11, 1958, Ser. No. 720,733
Claims priority, application Germany Mar. 13, 1957
11 Claims. (Cl. 23—182)

This invention relates to a process for producing boron- and phosphorus-free high purity silicon dioxide.

In the manufacture of high purity elementary silicon and in particular in making monocrystals of silicon for use in semi-conductor systems, technical or laboratory equipment of various kinds is required which is made preferably from quartz, i.e. crystallized silicon dioxide.

The synthetic quartz used for the manufacture of equipment of this kind, such as quartz crucibles, and the like, is conventionally produced from silicon tetrachloride by hydrolysis of the latter and subsequent filtration, drying, glowing and melting of the silicon dioxide formed.

Quartz apparatus parts of especially high purity are also required in the process of zone-refining, now well known in the art of producing semiconductor materials.

When monocrystals of silicon are drawn, or when crystalline silicon is zone-refined, as described, for instance, by W. G. Pfann in "J. of Metals" (July 1952), pages 747–754, the wall of the crucible or other container is due to react with the silicon melt treated therein, and the latter may thus become contaminated with the impurities contained in the crucible material. It is, therefore, of great importance that the silicon dioxide used for producing synthetic quartz serving as material for these crucibles and other industrial and laboratory utensils is free to the highest possible degree of impurities of any kind.

In the afore-mentioned zone-refining process, it has been proposed to purify silicon monocrystals destined for semiconductor purposes, by causing the crystal to pass through a zone of elevated temperature, in which a certain transverse portion of the crystal is molten, while the two solid portions and the molten zone are held together exclusively by the surface tension of the molten silicon in that zone. There would thus be no contact between the molten region and the walls of the device in which the solid portions of the monocrystal are necessarily supported during the movement of the latter through the refining zone. The molten zone would thus not receive any impurities from the apparatus walls. However, purification of the monocrystal from the impurities already contained therein is satisfactory only if the separation (segregation) coefficient of the impurity from the silicon crystal is sufficiently different from the value 1. This is not so in the case of boron and phosphorus which have separate coefficients of 0.9 and 0.35 respectively. The separation coefficient $k$ is obtained from the formula $$k = \frac{c_s}{c_1}$$

as described by O. Madelung in Encylcopedia of Physics, volume XX, Electrical Conductivity II, edited by S. Flügge, p. 25.

Consequently, boron and phosphorus are retained in the silicon crystal lattice more or less unchanged even after treatment of the crystal by zone-refining.

When boron- and phosphorus-containing silicon tetrachloride is hydrolyzed in order to obtain silicic acid, the following reactions occur:

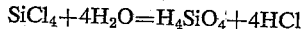
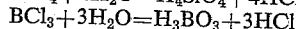
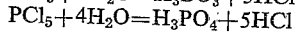

$$SiCl_4 + 4H_2O = H_4SiO_4 + 4HCl$$
$$BCl_3 + 3H_2O = H_3BO_3 + 3HCl$$
$$PCl_5 + 4H_2O = H_3PO_4 + 5HCl$$

Although the boric acid and phosphoric acid formed during the above hydrolysis reactions are soluble in water, it is nevertheless impossible to separate these acids quantitatively from silicic acid by washing or filtration because of the highly adsorptive properties of silicic acid which retains on its relatively large surface the major portion of boric and phosphoric acids.

It is, therefore, an object of our invention, to provide for a process by which synthetic quartz can be obtained which is free from boron and phosphorus at least to such a degree that neither of these two elements can be determined chemically or electrically, or is present in the quartz in a chemically or electrically effective concentration, whereby the synthetic quartz is particularly suited as material for the manufacture of crucibles and similar industrial and laboratory equipment.

The above mentioned drawbacks of the known methods of hydrolyzing silicon tetrachloride are avoided, and the aforesaid object is attained by the process according to our invention, whereby high purity silicic acid and correspondingly silicon dioxide practically completely free from boron and phosphorus are obtained through the steps of (a) hydrolyzing silicon tetrachloride in a manner known per se for instance, with water, and (b) extracting boric and phosphoric acid from the resulting impure silicic acid by admixing methanol to the aqueous suspension of the former and percolating a stream of a water-immiscible ether through the aqueous methanol suspension of the resulting $SiO_2$ precipitation.

We have found that the percolating step is particularly effective and leads to a practically complete extraction of both boric and phosphoric acid. The aqueous suspension of silicic acid is made to contain 30 to 60% by volume of methanol, and that isopropyl ether is uniquely suited as the extracting agent.

A small mass of solid caustic soda is preferably introduced into the aqueous methanol suspension and prevents the formation of volatile methyl ester of boric acid, due to the following saponification reaction:

$$(CH_3)_3BO_3 + 3NaOH = Na_3BO_3 + 3CH_3OH$$

Solid potassium hydroxide may be equally used, and the term "sodium hydroxide" mentioned hereinafter in this specification and in the appended claims is understood to mean equally potassium hydroxide.

A preferred apparatus for carrying out the process according to the invention is schematically illustrated in the accompanying drawing.

The apparatus itself is preferably built of quartz material purified according to the process of our invention. It comprises a main tubular container 2, which bears at its upper end connected thereto by means of a ground-in seat 2a a reflux condenser 1.

A condensate return pipe 8 disposed inside container 2 ends near the bottom of the latter in a frit 3 of porous quartz material. A descending pipe 9 is provided at its lower free end with a ground conical surface fitting in a corresponding seat 4a in the neck of retort 4, which can be heated by means of suitable, preferably electrical heating means 6. Between the bottom end of container 2 and the lower end of return pipe 8, there is arranged inside the container a stirrer 5, which is preferably operable magnetically from a rotary magnet 5a for rotation on a shaft 5b operable from a motor 10.

Isopropyl ether or another suitable ether is filled into pipe 8 and percolates through frit 3 in numerous finely distributed bubbles rising through the aqueous methanol suspension of silicon dioxide filled into the container up to the level of the junction of branch pipe 9. The ether dissolves the methanol and boric acid and phosphoric acid, both of which are easily soluble in methanol, and overflows at 9a into branch pipe 9 and into retort 4. In retort 4, the overflown boric and phosphoric acid containing methanol and isopropyl ether mixture is heated to about 70° C. whereby methanol and ether are continuously evaporated and condensed in the reflux condenser 1. The condensate mixture flows downwardly back into return pipe 8 and passes through percolator frit 3 back into container 1, thus completing the ether cycle.

Magnetical or mechanical operation of stirrer 5 maintains the suspension in container 2 in constant agitation, prevents the formation of a silicon dioxide deposit at the bottom of the container, and effects a continuously progressing desorption of boric acid and phosphoric acid from the surface of the $SiO_2$ particles, while the content of these acids in the suspension is continuously decreased by the progressing extraction of these acids in the methanol isopropyl ether mixture overflowing at 9a into retort 4. The formation of turbulence by stirrer 5 contributes to prolonging the path of the ether bubbles through the suspension and thus permits to achieve a very effective percolation.

A small quantity 7 of solid sodium hydroxide of highest purity in retort 4 prevents the formation of volatile boric acid methyl ester as mentioned above.

After the extraction is completed, the purified silicic acid is filtered off, dried and glowed to obtain silicon dioxide. Ultimately, the latter is melted to obtain crystalline quartz.

The above-described process according to our invention is particularly suited for producing high purity silicon dioxide and quartz from the hydrolyzed silicic acid obtained from silicon tetrachloride. The resulting high purity silicon dioxide contains less than $10^{-6}\%$ by weight of boron or phosphorus and is particularly suited for the manufacture of quartz vessels and the like utensils required in the manufacture of semiconductor materials such as silicon monocrystals.

The invention shall be further illustrated by two examples for carrying the same out in practice, which examples are, however, not intended to be limitative in any way or form.

*Example I*

600 grams of silicon tetrachloride are slowly introduced under cooling with ice water (0° C.) and constant stirring at 240 r.p.m. into 10 liters of water free from ions and obtained from an ion exchanger of the type described by Dickel and Becker in Chem. Ing. Techn. 28 (1956), p. 529, which water is contained in a rotosil apparatus.

This apparatus is described by F. A. Pohl in Zeitschr. f. analyt. Chemie 157 (1957), p. 6.

The resulting suspension of silicic acid is allowed to settle for about 15 minutes, and half the amount of supernatant aqueous hydrochloric acid is siphoned off. 5 liters of methanol (having a concentration of 100% weight/volume of $CH_3OH$) are then added to the remaining suspension under stirring. The distillation retort (4) of the apparatus is then charged with 2 liters of pure isopropyl ether (B.P.=67.5° C.) and 50 grams of high purity solid sodium hydroxide (or 50 grams of potassium hydroxide), the retort is heated to 70° C., and percolation is carried out for six hours under constant stirring of the suspension at 120 r.p.m.

After the stirrer is turned off, and the silicic acid has been allowed to settle, the supernatant aqueous methanol solution is siphoned off with a quartz scooping frit as completely as possible, and the moist sediment of silicic acid is then transferred in a rotosil bowl into a drying oven in which it is heated to dryness at 200° C. during about 3 hours, and then glowed for 30 minutes at 600° C. About 200 grams of high purity silicon dioxide practically free from boron and phosphorus are obtained.

The isopropyl ether and methanol used in this example can be almost quantitatively recovered by distillation and can be used in a subsequent percolation step.

The content of boric acid of about $10^{-2}\%$ by weight in the initial silicon tetrachloride is reduced by the above treatment to maximally $10^{-6}\%$.

*Example II*

800 g. sodium silicate (water glass) are diluted in container 2 with de-ionized water to a volume of 10 liters and 0.40 liter of 6-normal hydrochloric acid are added thereto, whereby a pH value of between 1 and 2 is attained. The precipitating silicic acid is permitted to settle. Half the supernatant hydrochloric acid solution is then siphoned off, and 5 liters of methanol (concentration 100% $CH_3OH$) are added to the remaining approximately 5 liters, and mixed therewith by stirring.

2 liters of isopropyl ether and 50 grams of solid sodium hydroxide are then charged into the distilling vessel 4 and percolation (or "perforation") of first the isopropyl ether and later the isopropylether-methanol mixture through the perforated diaphragm (quartz frit 3) is continued for about 6 hours under stirring at a speed of 120 r.p.m.

The stirrer is then turned off and the silicic acid is again permitted to settle. The supernatant solution is then drawn off as completely as possible through a siphon tube, the immersed opening of which is closed by a quartz frit.

The silicic acid is then transferred to a rotosil bowl and dried at 200° C. in a drying oven, whereupon it is glowed at about 600° C. to convert it to silicon dioxide. About 200 g. of $SiO_2$ are obtained.

When the initial silicon tetrachloride contained about $10^{-2}\%$ by weight of boric acid, the final product contains maximally $10^{-6}\%$ of boric acid.

Isopropyl ether and methanol are recovered almost quantitatively by distillation and can be used for a subsequent percolation (or "perforation") of another batch of silicon tetrachloride.

The resulting silicon dioxide is then melted at 2.000° C. to convert the same into quartz.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What is claimed is:

1. A process for producing high purity, substantially boron- and phosphorus-free silicic acid, comprising adding methanol to an aqueous mixture of silicic acid containing boric and phosphoric acids as impurities, adding to said aqueous methanol mixture a water-immiscible ether capable of dissolving methanol, transferring said boric and phosphoric acid impurities from the silicic acid to the methanol ether mixture; separating the methanol ether mixture from the purified silicic acid.

2. The process of claim 1, wherein said ether is isopropyl ether.

3. The process of claim 1, wherein said aqueous mixture of silicic acid, containing boric and phosphoric acids as impurities, is obtained by hydrolyzing silicon tetrachloride.

4. The process of claim 1, wherein said aqueous mixture of silicic acid containing boric and phosphoric acids as impurities is obtained by reacting sodium silicate with an aqueous hydrochloric acid solution.

5. process for producing high purity, substantially boron- and phosphorus-free silicon dioxide, comprising adding methanol to an aqueous mixture of silicic acid containing boric and phosphoric acids as impurities; adding to said aqueous methanol mixture a water-immiscible ether capable of dissolving methanol; transferring said boric and phosphoric acid impurities from the silicic acid to the methanol ether mixture, separating the methanol ether mixture from the purified silicon acid; and converting said purified silicic acid to silicon dioxide.

6. A process for producing high purity, substantially boron- and phosphorus-free silicic acid, comprising adding methanol to an aqueous mixture of silicic acid containing boric and phosphoric acids as impurities, said methanol being added in an amount equal to about 30–60% by volume of the total volume of the aqueous methanol mixture, adding to said aqueous methanol mixture a water-immiscible ether capable of dissolving methanol, transferring said boric and phosphoric acid impurities from the silicic acid to the methanol ether mixture; separating the methanol ether mixture from the purified silicic acid.

7. The process of claim 6, wherein said ether is isopropyl ether.

8. The process of claim 6, wherein said aqueous mixture of silicic acid, containing boric and phosphoric acids as impurities is obtained by hydrolyzing silicon tetrachloride.

9. The process of claim 6, wherein said aqueous mixture of silicic acid containing boric and phosphoric acids as impurities is obtained by reacting sodium silicate with an aqueous hydrochloric acid solution.

10. A process for producing high purity, substantially boron- and phosphorus-free silicon dioxide, comprising adding methanol to an aqueous mixture of silicic acid containing boric and phosphoric acids as impurities, said methanol being added in an amount equal to about 30–60% by volume of the total volume of the aqueous methanol mixture, adding to said aqueous methanol mixture a water-immiscible ether capable of dissolving methanol; transferring said boric and phosphoric acid impurities from the silicic acid to the methanol ether mixture, separating the methanol ether mixture from the purified silicon acid; and converting said purified silicic acid to silicon dioxide.

11. In a process for producing high-purity, substantially boron-free and phosphorus-free silicic acid and silicon dioxide by extracting boric and phosphoric acids from an aqueous methanol suspension of silicic acid, with a water-immiscible ether capable of dissolving methanol, the improvement which comprises adding solid sodium hydroxide to said ether to prevent the formation of volatile boric acid methyl ester from the extracted boric acid and methanol.

References Cited in the file of this patent

UNITED STATES PATENTS

| | | |
|---|---|---|
| 1,751,955 | Stoewener | Mar. 25, 1930 |
| 2,227,833 | Hixson et al. | Jan. 7, 1941 |
| 2,885,265 | Cunningham | May 5, 1959 |